United States Patent
Koehnen et al.

(10) Patent No.: US 8,418,340 B2
(45) Date of Patent: Apr. 16, 2013

(54) CLAMPING DEVICE FOR TANK ASSEMBLY

(75) Inventors: Thomas Koehnen, Hessen (DE);
Michael Haberberger,
Ginsheim-Gustavsburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 317 days.

(21) Appl. No.: 12/985,610

(22) Filed: Jan. 6, 2011

(65) Prior Publication Data

US 2012/0174371 A1    Jul. 12, 2012

(51) Int. Cl.
    *B23P 11/00*         (2006.01)
    *B23Q 3/18*         (2006.01)
    *B23Q 1/25*         (2006.01)
    *B25B 27/14*         (2006.01)
    *F16M 11/00*         (2006.01)

(52) U.S. Cl.
    USPC ........... 29/428; 269/60; 269/55; 269/71; 29/464; 29/240; 29/281.1; 248/122.1; 248/128; 248/130; 248/133

(58) Field of Classification Search .......... 269/60, 269/55, 71, 75; 29/255, 281.1, 464, 428, 29/469, 240; 248/122.1, 127, 130, 132, 133, 248/128
See application file for complete search history.

(56) References Cited

U.S. PATENT DOCUMENTS

| | | | | |
|---|---|---|---|---|
| 1,732,829 A | * | 10/1929 | Boardman | 248/146 |
| 2,006,451 A | * | 7/1935 | Glidden | 366/213 |
| 3,625,504 A | * | 12/1971 | Walker | 269/55 |
| 5,346,165 A | * | 9/1994 | Frean et al. | 248/146 |
| 5,810,309 A | * | 9/1998 | Augustine et al. | 248/313 |
| 5,996,207 A | * | 12/1999 | Brown et al. | 29/464 |
| 6,102,241 A | * | 8/2000 | Palazzo | 220/586 |
| 6,170,141 B1 | * | 1/2001 | Rossway et al. | 29/281.1 |
| 6,292,999 B1 | * | 9/2001 | Rossway et al. | 29/559 |
| 6,298,536 B1 | * | 10/2001 | Rossway et al. | 29/281.1 |
| 6,408,526 B1 | * | 6/2002 | Montesanti et al. | 33/1 M |
| 6,619,640 B1 | * | 9/2003 | Ploski | 269/17 |
| 7,070,142 B2 | * | 7/2006 | Schnurr | 242/580 |
| 7,770,292 B2 | * | 8/2010 | Stretton | 29/889.1 |
| 2007/0186834 A1 | * | 8/2007 | Jordan et al. | 114/74 A |
| 2010/0192346 A1 | * | 8/2010 | Simmons | 29/281.1 |

FOREIGN PATENT DOCUMENTS

JP         04310337 A    *    11/1992

* cited by examiner

*Primary Examiner* — Essama Omgba
(74) *Attorney, Agent, or Firm* — Dinsmore & Shohl LLP (57) ABSTRACT

An assembly for mounting components on a vessel having a boss with an adapter and a method of attaching. In one embodiment, the assembly includes an adjustable frame including a support positioned between a first end and a second end, a fixed clamping device attached to the first end of the frame and including a lower plate and pivotally attached upper plate such that at least one of the lower and upper plates has a shaped jaw formed therein to hold a first adapter. The assembly further includes a rotatable clamping device made up of a lower clamping plate along with a lower plate rotatably attached to the lower clamping plate, and an upper plate pivotally attached to the lower plate. At least one of the lower and upper plates have a jaw formed therein to hold a second adapter.

21 Claims, 13 Drawing Sheets

CLAMPING DEVICE FOR TANK ASSEMBLY

BACKGROUND OF THE INVENTION

This invention relates generally to methods of mounting components to vessels, and more particularly to methods of mounting components to vessels without damaging the vessel or the inner liner of the vessel.

High pressure vessels can be used to store gases, such as hydrogen or compressed natural gas (CNG), for example, under pressure. These high pressure vessels can be fiber composite vessels (known as "type 4" vessels) because they have a good storage to weight ratio.

Type 4 vessels have two layers: an outer layer, made of a carbon fiber matrix for example, designed to bear the mechanical load; and an inner layer, or liner, made of a bubble of plastic, designed to prevent leaking. The fiber composite can be a carbon fiber reinforced plastic (CFRP) structure.

The mounting of components, such as valves, to these high pressure vessels can damage the interface between the boss and the inner liner of the vessel when torque is applied to the component.

Therefore, there is a need for apparatus and methods for mounting components to vessels which reduce or prevent damage to the vessel.

SUMMARY OF THE INVENTION

The present invention meets this need. One aspect of the invention is an assembly for mounting components on a vessel. The vessel has a boss with an adapter. In one embodiment, the assembly includes an adjustable frame including a support positioned between a first end and a second end, the frame adjustable in at least one of an x, y, and z direction; a fixed clamping device attached to the first end of the frame, the fixed clamping device comprising a lower plate and an upper plate pivotally attached to the lower plate, at least one of the lower and upper plates having a jaw formed therein, the jaw being shaped to hold a first adapter; a rotatable clamping device on the second end of the frame, the rotatable clamping device comprising a lower clamping plate, a lower plate rotatably attached to the lower clamping plate so that movement of the lower clamping plate causes rotation of the lower plate, and an upper plate pivotally attached to the lower plate, at least one of the lower and upper plates having a jaw formed therein, the jaw being shaped to hold a second adapter.

Another aspect of the invention relates to a method of attaching a component to a vessel having a boss with an adapter. In one embodiment, the method includes providing an assembly comprising: an adjustable frame including a support positioned between a first end and a second end, the frame adjustable in at least one of an x, y, and z direction; a fixed clamping device attached to the first end of the frame, the fixed clamping device comprising a lower plate and an upper plate pivotally attached to the lower plate, at least one of the lower and upper plates having a jaw formed therein, the jaw being shaped to hold a first adapter; a rotatable clamping device on the second end of the frame, the rotatable clamping device comprising a lower clamping plate, a lower plate rotatably attached to the lower clamping plate so that movement of the lower clamping plate causes rotation of the lower plate, and an upper plate pivotally attached to the lower plate, at least one of the lower and upper plates having a jaw formed therein, the jaw being shaped to hold a second adapter; placing the vessel on the supports; rotating the vessel so that the first adapter fits into the jaw of one of the fixed clamping device or the rotatable clamping device; closing the upper plate of the one of the fixed clamping device or the rotatable clamping device to clamp the first adapter in place; rotating the vessel so that the second adapter fits into the jaw of the other of the fixed clamping device or the rotatable clamping device; closing the upper plate of the other of the fixed clamping device or the rotatable clamping device to clamp the second adapter in place; and attaching at least one component to the first or second adapter.

DETAILED DESCRIPTION OF THE INVENTION

The assembly provides a way to mount (or unmount) components to a vessel sub-assembly without damage to the carbon fiber reinforced plastic (CFRP) structure and inner liner. The assembly allows the mounting of components, such as valves, on both ends of the vessel without applying any load transition over the components to the CFRP structure and inner liner of the vessel. Therefore, the assembly permits a high quality and reproducible assembly process. It can reduce or eliminate the waste of the vessel and components, reducing costs and increasing durability and quality.

The assembly has a stable frame with clamping devices on both ends. The frame is adjustable in at least one of the x, y, and z directions. It is typically adjustable in the y direction, and it can optionally be adjustable in the x and/or z directions as well. One end has a fixed clamping device in which no rotational movement of the clamping device is possible, and the other end has a clamping device which is rotatable. Both clamping devices are adjustable in at least one of the x, y, and z directions. One or both of the clamping devices can have vernier adjustments, which allow fine movement of the clamping devices in at least one of the x, y, and z directions, if desired. The clamping devices are typically adjustable in the x and z direction, and can optionally be adjustable in the y direction. The reference point for the y direction is the longitudinal axis of the vessel, the x direction is the horizontal direction, and the z direction is the vertical direction.

The assembly holds the vessel stable during the assembly process. The vessel is clamped rigidly to the assembly frame which does not permit movement in any direction or rotation of the vessel during the process of mounting the component(s). This lack of movement is important because when torque is applied to the component during mounting, load transmission from the mounted component over the boss to the inner liner is avoided. The boss is fixed in the clamping devices on both ends of the vessel.

Figure 1:
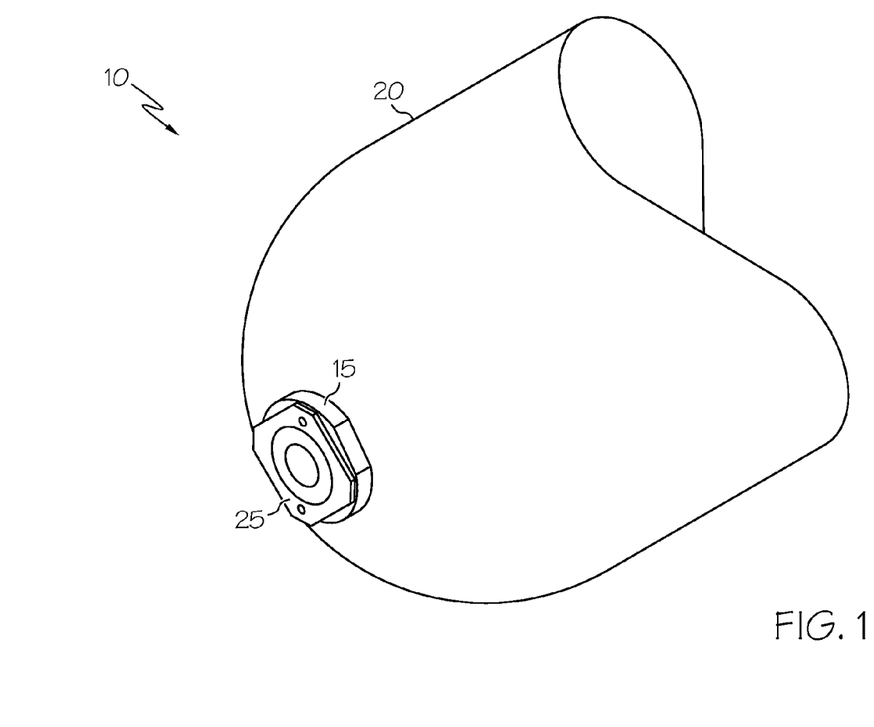
FIG. 1 is an illustration of the outside of one embodiment of a vessel.

As shown in FIG. 1, the vessel 10 has a boss 15 which connects the inner liner (not shown) with the outer shell 20.

The inner liner holds the gas, such as hydrogen. The outer shell 20 is typically made of CFRP. There is an adapter 25 on the boss 15.

The components to be mounted to the vessel often need to be arranged in a specific orientation. For example, where each component comprises one or more valves or other parts, the valves on the front and rear may need a particular orientation relative to one another. In order to achieve this, the vessel is mounted rigidly to the assembly that does not permit movement in the x, y, or z directions or rotation of the vessel during the mounting process. The boss adapter is fixed in the assembly. The front component is attached to the boss adapter of the vessel, and then the rear component is attached so that there is a defined orientation between the front and rear components. In one embodiment, there is a measuring scale on both clamping devices in order to obtain the proper orientation.

The boss adapters are fixed in a support on both ends of the vessel. The support for the front component is fixed; no adjustment in the rotational direction is possible. The support for the rear component is adjustable in the rotational axis of the vessel. The assembly has alignment supports to position both components in the defined orientation.

FIGS. 2-13 illustrate one embodiment of the assembly and methods of clamping the vessel and mounting the component(s).

The assembly has alignment supports to position one or both of the components, if desired. The alignment supports ensure that there is no rotational movement of the components, when the torque is applied to the component.

Figure 2:
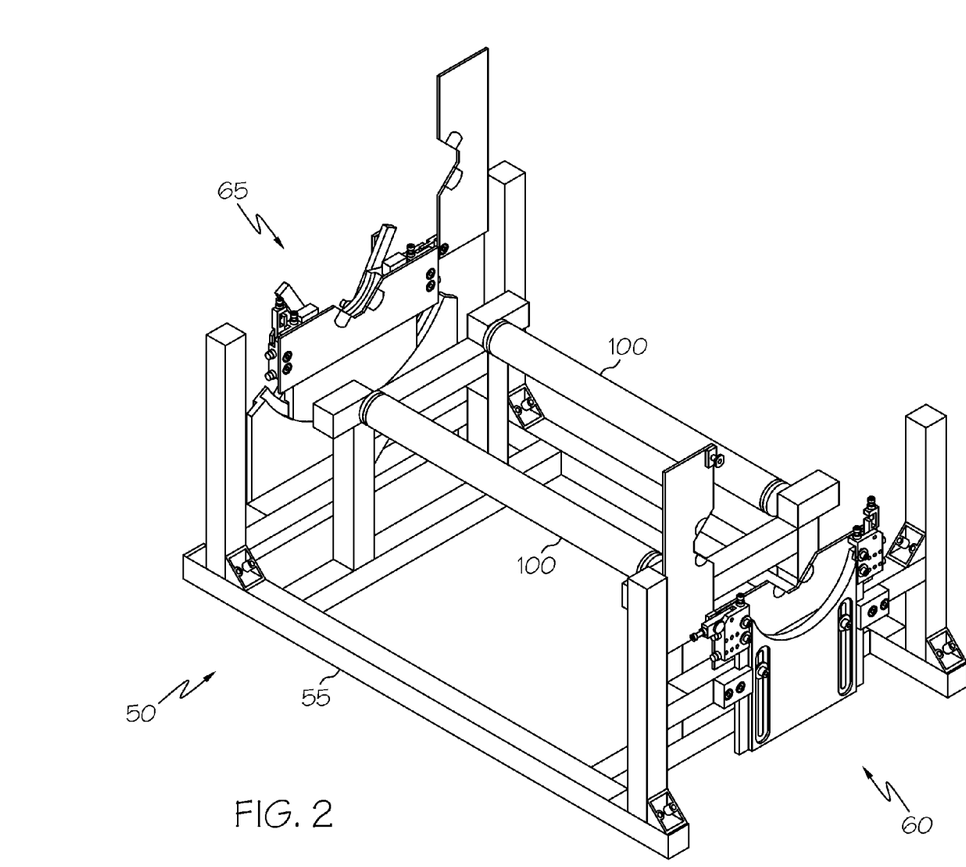
FIG. 2 is an illustration of one embodiment of an assembly of the present invention.

As shown in FIG. 2, in one embodiment, the assembly 50 includes a frame 55 with front and rear ends. Typically, the ends are perpendicular to the sides of the frame. There is a fixed clamping device 60 on one end and a rotatable clamping device 65 on the other end. The frame 55 is adjustable at least in length so that it can accommodate vessels of different dimensions. One or both of ends can be moved to change the length of the frame. The frame can be adjustable in all directions if desired.

Figure 3:
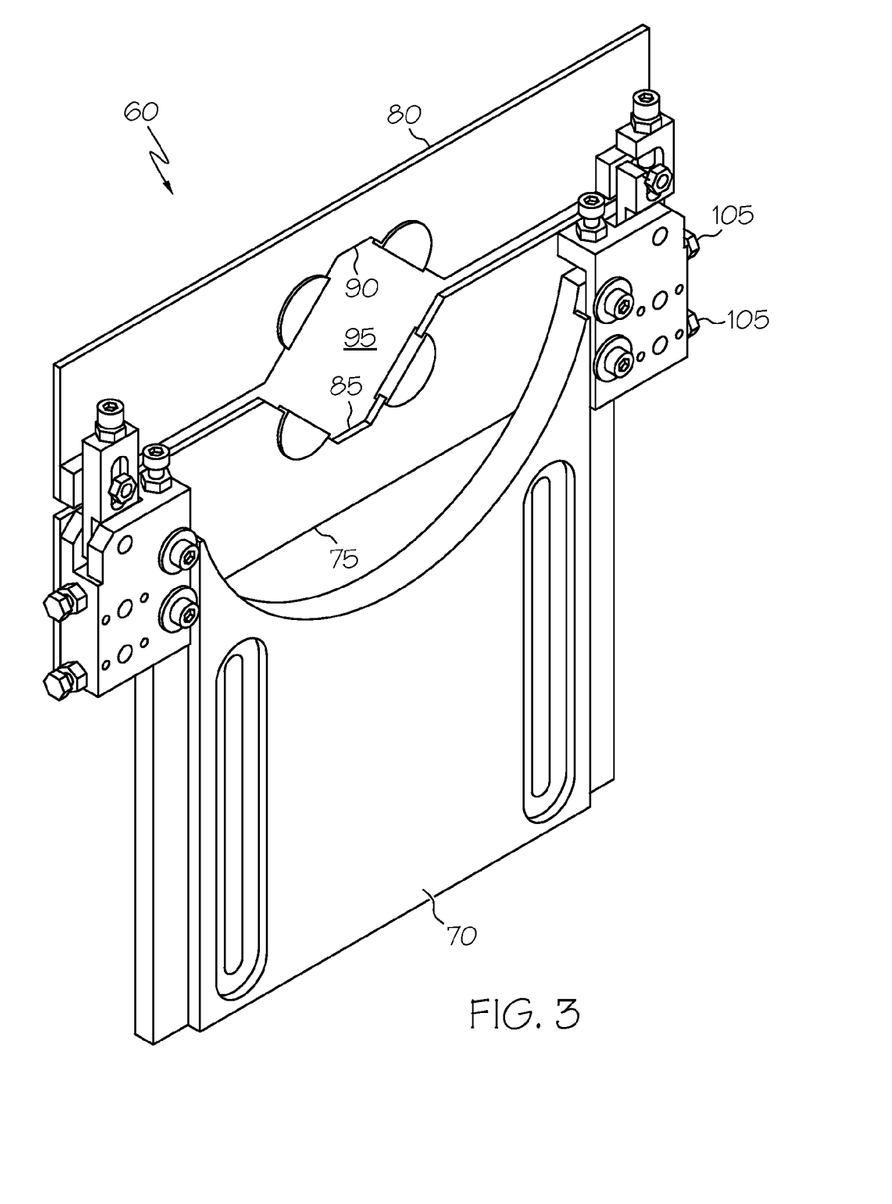
FIG. 3 is an illustration of one embodiment of a fixed clamping device.

As shown in FIG. 3, in one embodiment, the fixed clamping device 60 has a mounting plate 70. The mounting plate 70 can be adjustable in the x and z directions. A lower plate 75 is attached to the mounting plate 70. An upper plate 80 is pivotally attached to the lower plate 75 so that the upper plate 80 can open and close. The lower plate 75 and the upper plate 80 hold the vessel rigidly. Jaws 85, 90 are formed in the lower plate 75 and upper plate 80, so that when the lower and upper plates 75, 80 are closed, an opening 95 is formed between them. The jaws 85, 90 are shaped to match the boss adapter 25 so that it is held tightly when the lower and upper plates 75, 80 are closed. Jaws can be formed in the lower plate, the upper plate, or both.

The mounting plate 70, and/or lower and upper plate 75, 80 can include vernier adjustments 105 for adjusting in the x and z directions, if desired.

Figure 4:
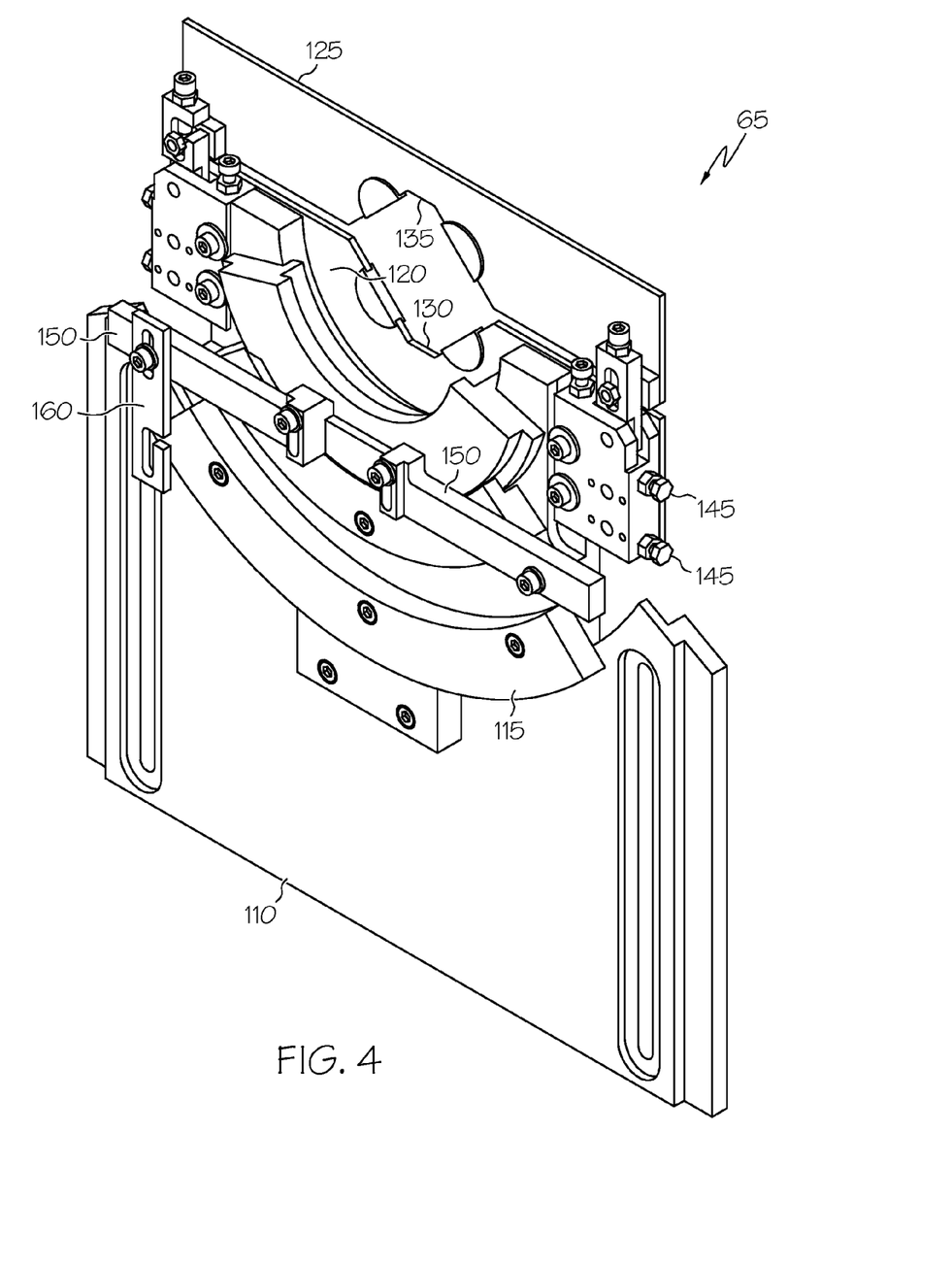
FIG. 4 is an illustration of one embodiment of a rotatable clamping device.

One embodiment of the rotatable clamping device 65 is shown in FIG. 4. There is a turntable plate 110 with a lower clamping plate 115. A lower plate 120 and an upper plate 125 are pivotally attached so that the upper plate 125 opens and closes. Jaws 130, 135 are formed in lower plate 120 and upper plate 125. The jaws 130, 135 are shaped to match the boss adapter. Jaws can be formed in the lower plate, the upper plate, or both.

Lower plate 120 is attached to the lower clamping plate 115 so that movement of the lower clamping plate 115 moves the lower plate 120 and upper plate 125.

Figure 11:
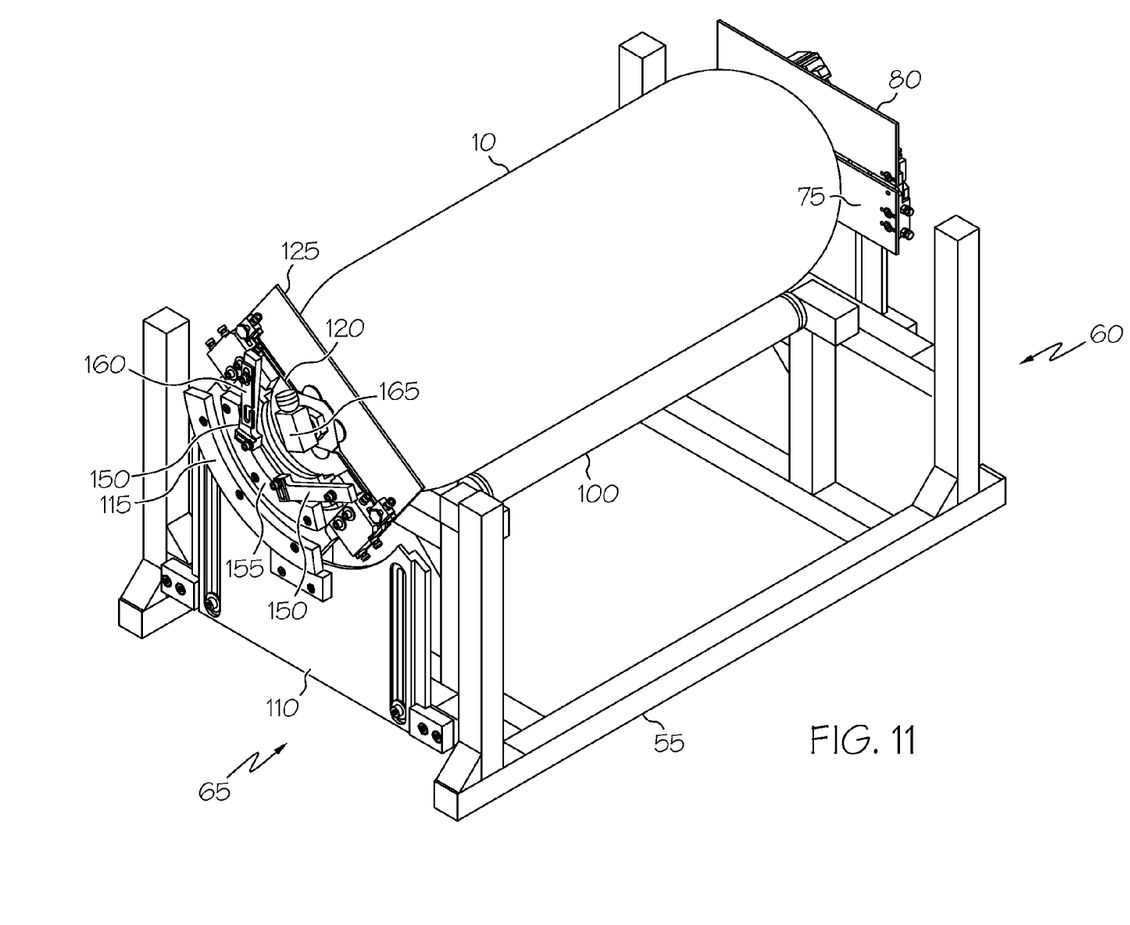
FIGS. 11-13 are an illustration of a method of attaching a component using the embodiment of the rotatable clamping device shown in FIGS. 5-7.
Figure 12:
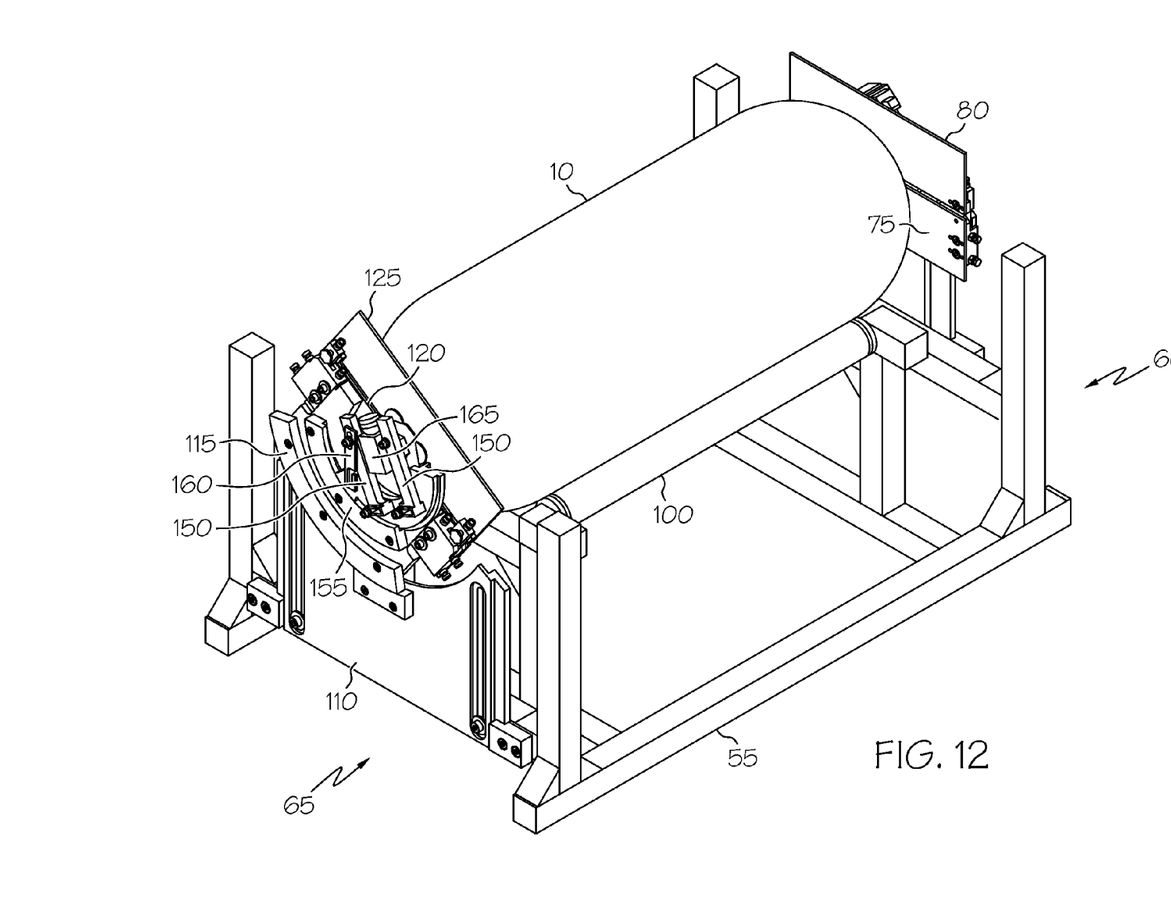
Figure 13:
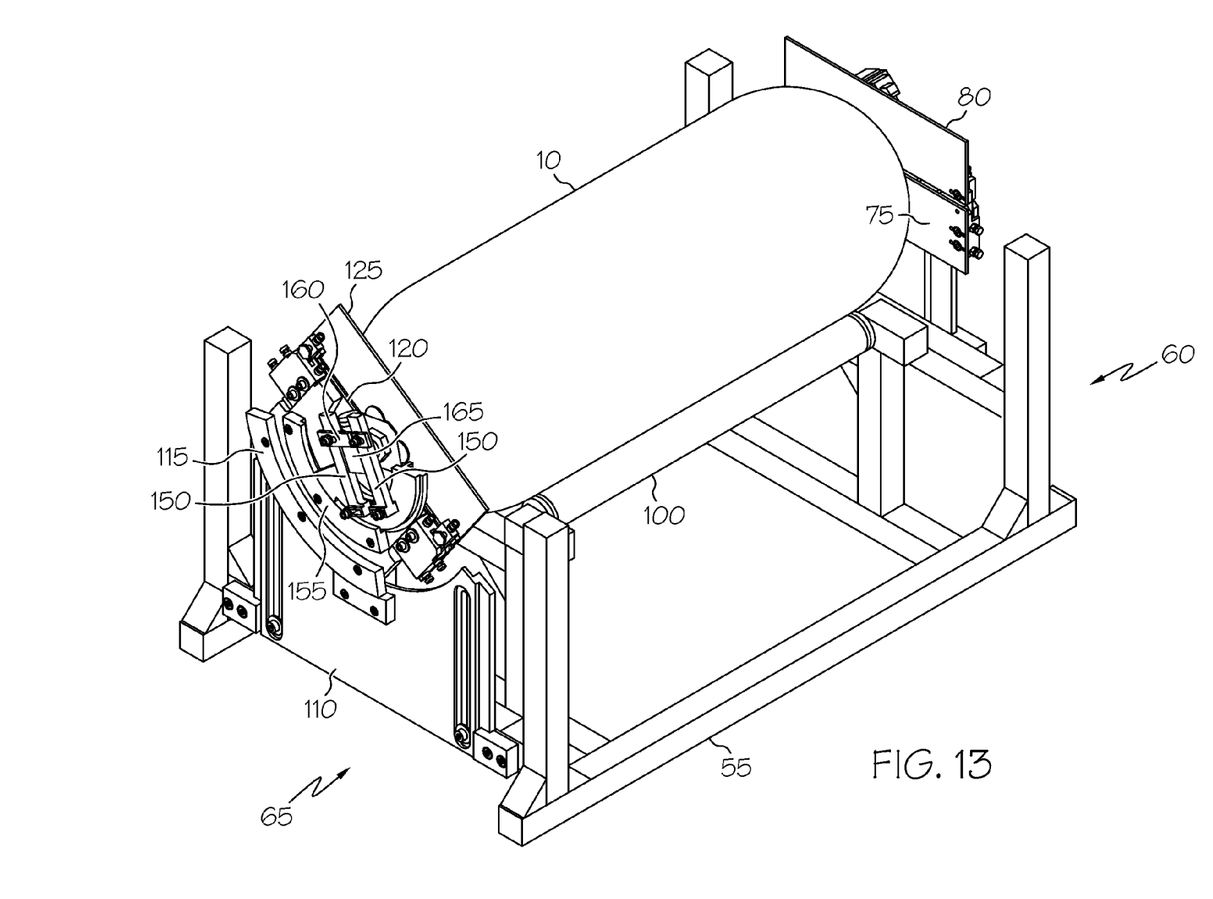

In one embodiment, the lower clamping plate 115 is curved and attached to the curved top of the turntable plate 110 so that when the curved lower clamping plate 115 is moved along the curved turntable plate 110, the lower plate 120 and upper plate 125 are turned, as shown in FIGS. 11-13. This allows the jaws 130, 135 to be matched to the position of the boss adapter. The lower clamping plate 115 can be secured in position after rotation.

In one embodiment, the rotatable clamping device 65 can include alignment bars 150 which are used to fix the component. There can optionally be an interlock 160 to secure the alignment bars 150.

There can optionally be vernier adjustments 145 on the turntable plate 110 and/or the lower and upper plate 120, 125 to adjust in the x and z directions, if desired.

Figure 5:
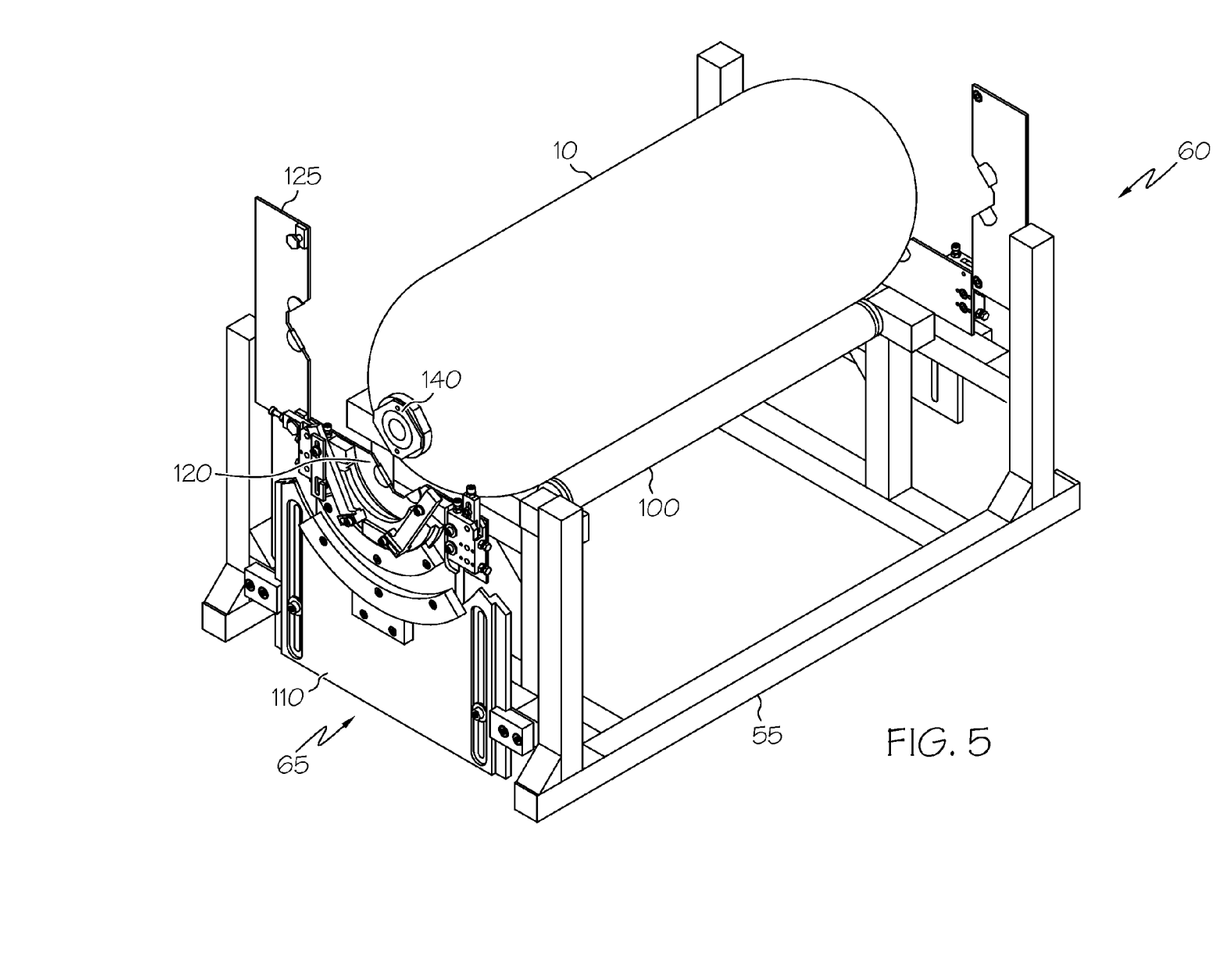
FIGS. 5-7 are an illustration of a method of clamping a vessel using one embodiment of a rotatable clamping device.

The vessel 10 is positioned on the frame 55, as shown in FIG. 5. The frame 55 can include one or more supports 100 which ensure that the vessel is parallel to the ground. The supports can be adjustable in the x and z direction, if desired. Any type of supports which allow rotation of the vessel can be used, such as rods, bars, and the like. Suitable supports include rollers which will allow easy rotation of the vessel during the preparation for mounting. Other types of supports can be used however.

Figure 6:
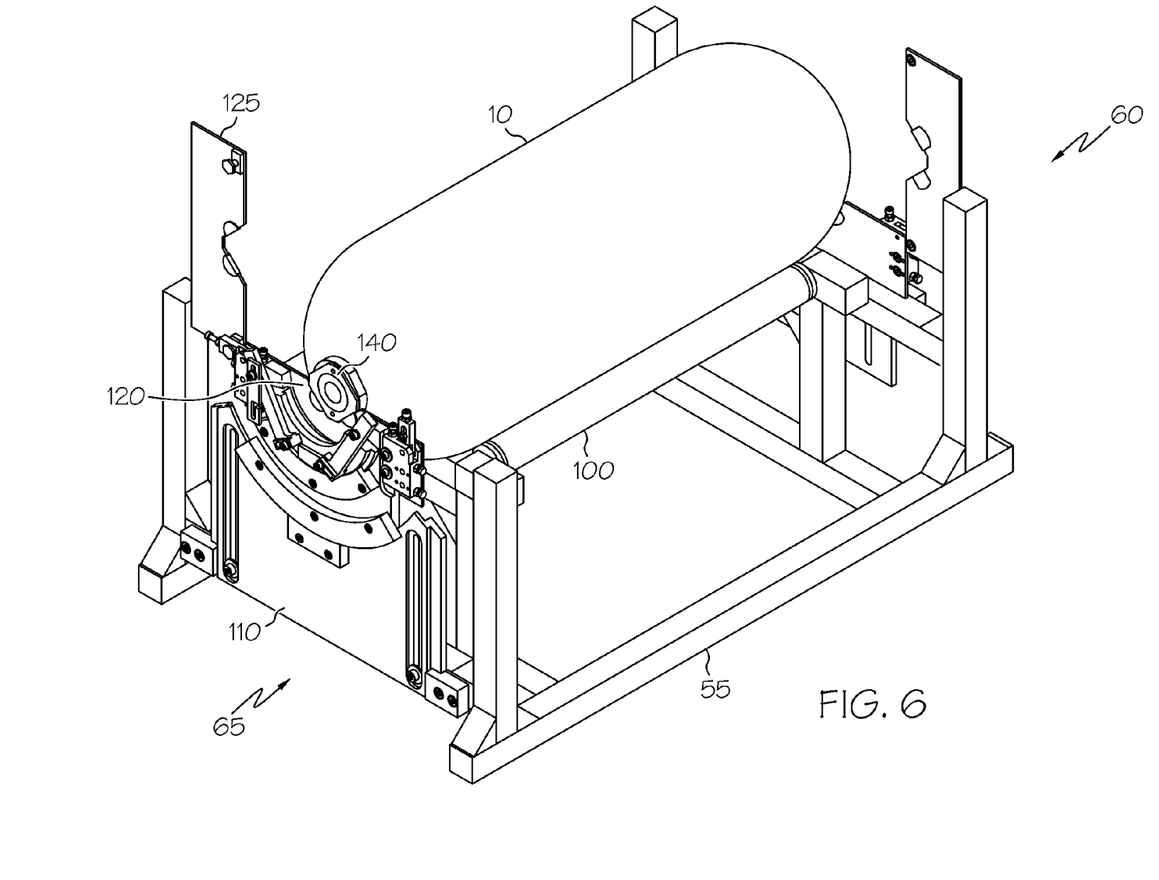
Figure 7:
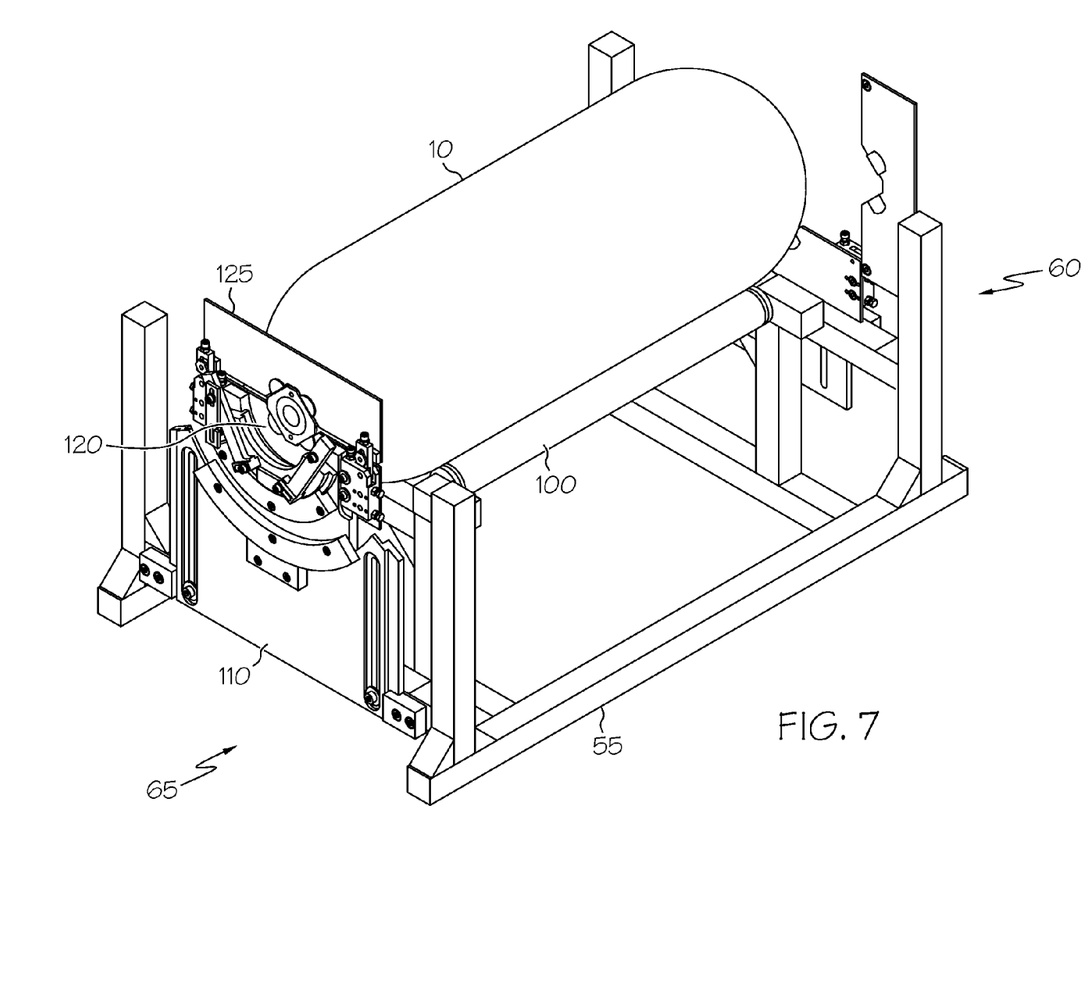

As shown in FIG. 6, the turntable plate 110 is raised until the boss adapter 140 fits into the jaw 130 of the lower plate 120 and secured at the proper height. The upper plate 125 is closed in order to clamp the boss adapter 140 rigidly, as shown in FIG. 7.

Figure 8:
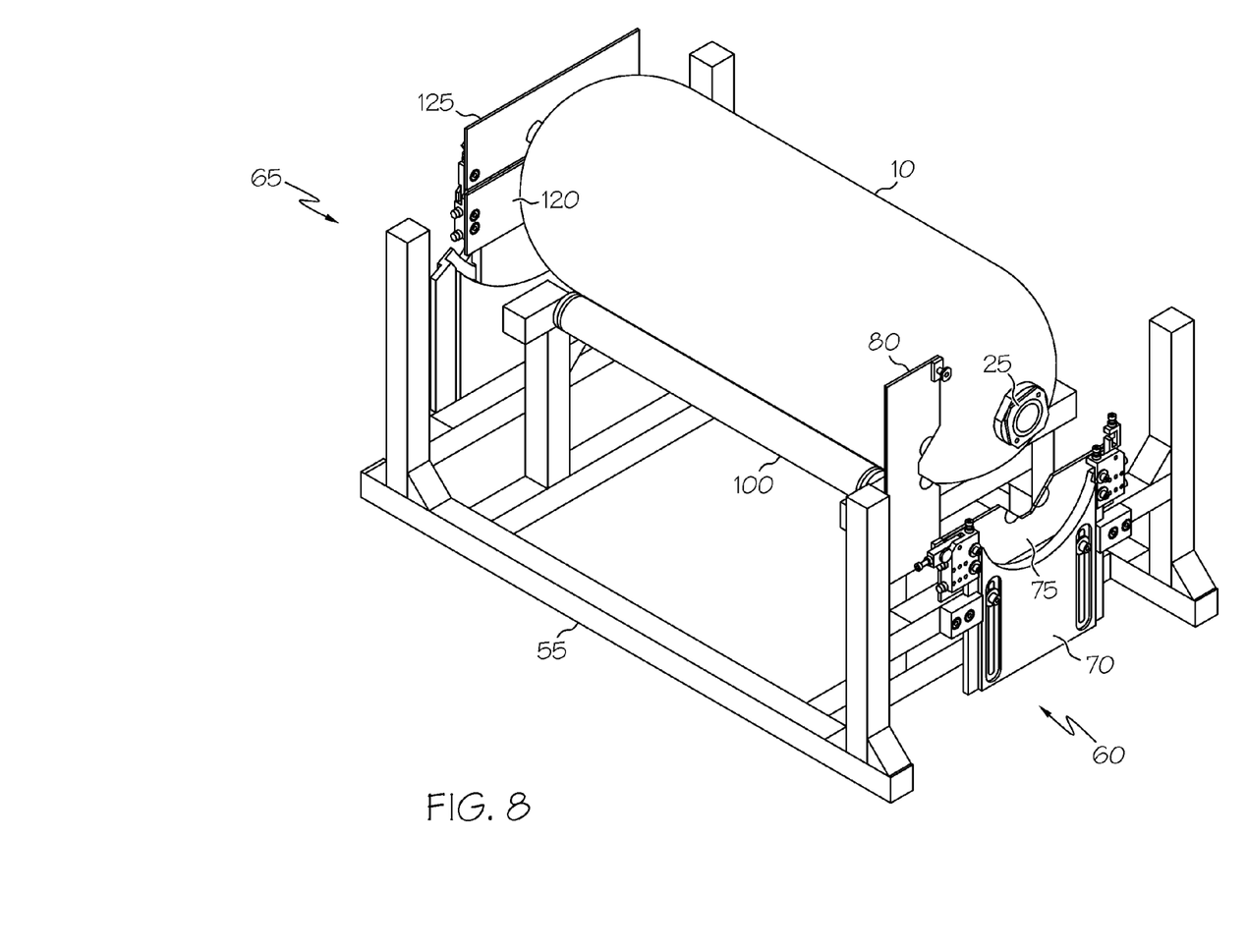
FIGS. 8-10 are an illustration of a method of clamping a vessel using one embodiment of a fixed clamping device.
Figure 9:
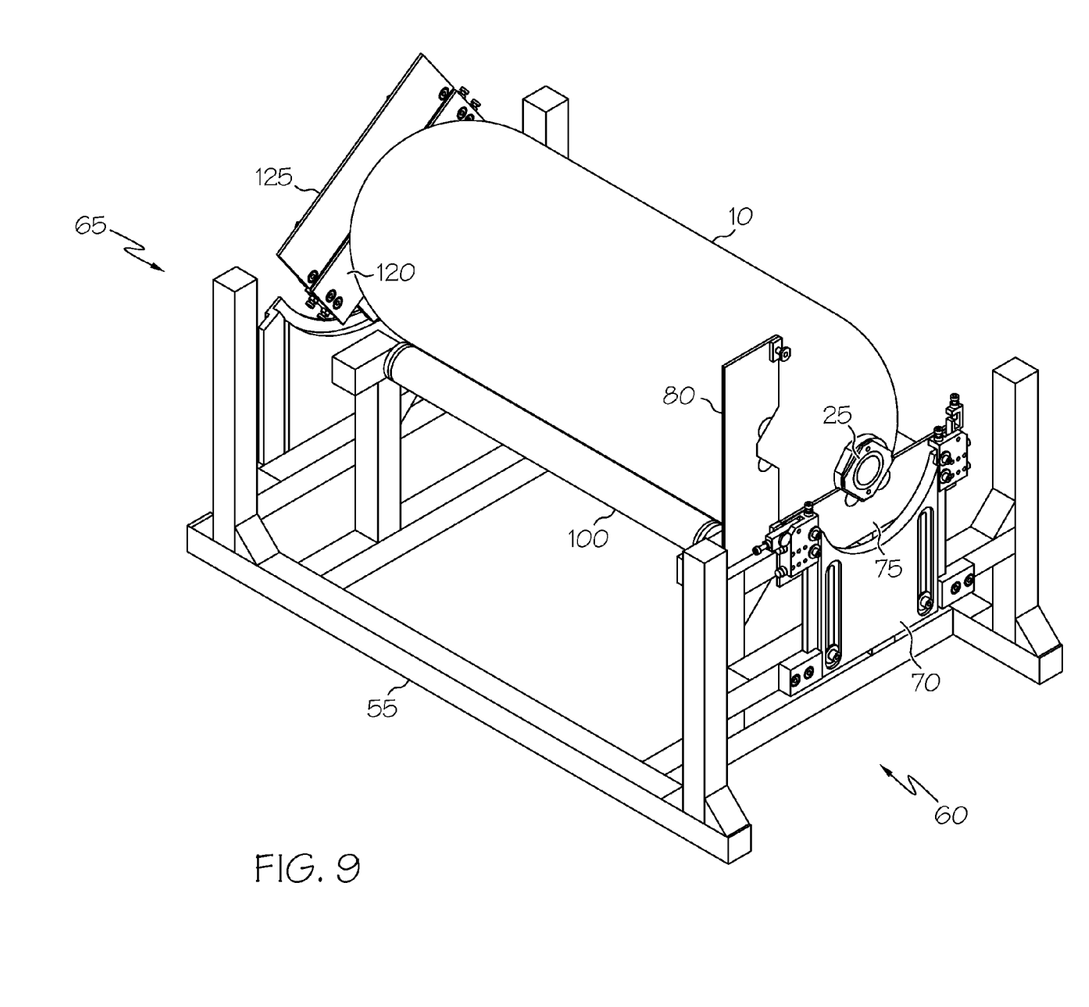
Figure 10:
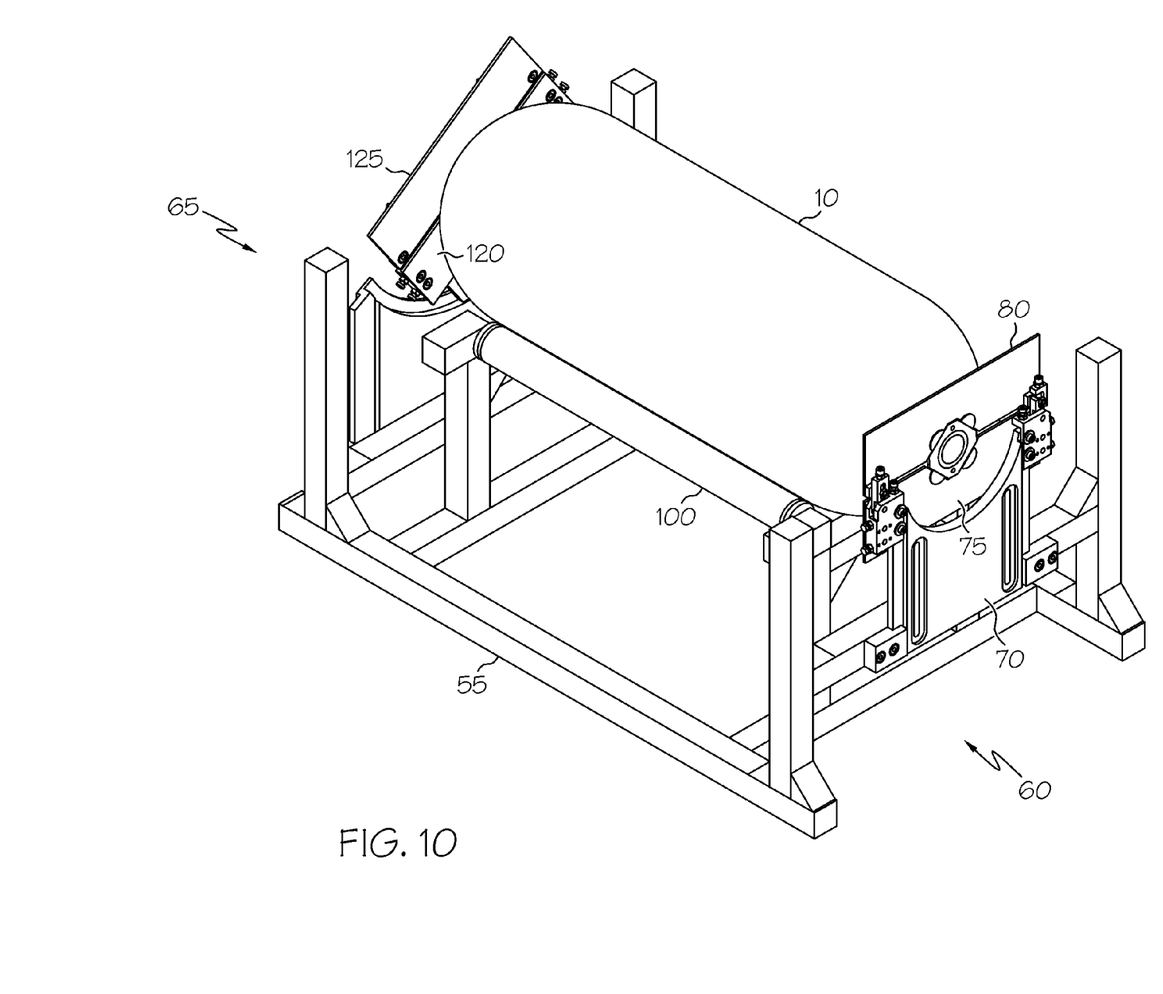

Next, the fixed clamping device is secured to the other end of the vessel 10. As shown in FIG. 8, the boss adapter 25 is not in a position to fit into the jaw 85. Therefore, the vessel 10 is rotated into the proper position so that the lower plate jaw 85 matches the boss adapter 25, as shown in FIG. 9. This rotation moves the lower clamping plate 115 and the lower and upper plates 120, 125 of the rotatable clamping device on the opposite end. The mounting plate 70 is raised until the boss adapter 25 fits into the jaw 85 of the lower plate 75. The mounting plate 70 can then be secured at the proper height. The upper plate 80 is closed in order to clamp the boss adapter 25 securely, as shown in FIG. 10.

When there is a defined orientation between the front and rear components, a goniometer can be used on both clamping devices to obtain the proper alignment of the components. The mounting position of the component on the fixed clamping device end is typically determined first, and the resulting angle for the component in the rotatable clamping device end is then determined.

The components, such as valves, can then be mounted (or unmounted) on the front and rear of the vessel without damaging the liner.

As shown in FIGS. 11-13, component 165 is attached to the ends of the vessel with the rotatable clamping device so that it is hand-tight, The clamping plate 155 of the alignment bars 150 can be unstressed and the alignment bars 150 moved to the sides of the component 165. The alignment bars 150 can be secured with a interlock 160, if desired. There can be one or more alignment bars, and they can have different shapes, as desired. The alignment bars can be used to hold the component steady when torque is applied to the component. It can also be used to align the component on the vessel in relation to the component on the opposite end, if desired. When the component is oriented in the proper position and stabilized with the alignment bars, it can be tightened using a defined torque by tightening a screw-nut on the back side of the component, for example. The alignment bars help to stabilize the component; without them, the component might rotate slightly during the application of torque.

The steps would be reversed to remove the vessel from the assembly after the components are attached.

Alternatively, the vessel could be secured to the fixed clamping device first, and then to the rotatable clamping device.

Further, it is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. An assembly for mounting components on a vessel, the vessel having a boss with an adapter, the assembly comprising:
   an adjustable frame including a support positioned between a first end and a second end, the frame adjustable in at least one of an x, y, and z direction;
   a fixed clamping device attached to the first end of the frame, the fixed clamping device comprising a lower plate and an upper plate pivotally attached to the lower plate, at least one of the lower and upper plates having a jaw formed therein, the jaw being shaped to hold a first adapter;
   a rotatable clamping device on the second end of the frame, the rotatable clamping device comprising a lower clamping plate, a lower plate rotatably attached to the lower clamping plate so that movement of the lower clamping plate causes rotation of the lower plate, and an upper plate pivotally attached to the lower plate, at least one of the lower and upper plates having a jaw formed therein, the jaw being shaped to hold a second adapter.

2. The assembly of claim 1 wherein the support is rotatable.

3. The assembly of claim 1 wherein the fixed clamping device further comprises a mounting plate, the lower plate attached to the mounting plate, the mounting plate movable in at least one of the x, y and z directions.

4. The assembly of claim 1 further comprising at least one vernier adjustment attached to the fixed clamping device, the vernier adjustment permitting adjustment of the fixed clamping device in at least one of the x, y, and z directions.

5. The assembly of claim 4 wherein the at least one vernier adjustment is attached to a mounting plate or the lower plate of the fixed clamping device, or both, the vernier adjustment permitting adjustment of the mounting plate or the lower plate of the fixed clamping device, or both in at least one of the x, y, and z directions.

6. The assembly of claim 1 wherein the rotatable clamping device further comprises a turntable plate, the lower clamping plate attached to the turntable plate, the turntable plate being movable in at least one of the x, y, and z directions.

7. The assembly of claim 1 further comprising at least one vernier adjustment attached to the rotatable clamping device, the vernier adjustment permitting adjustment of the rotatable clamping device in at least one of the x, y, and z directions.

8. The assembly of claim 7 wherein the at least one vernier adjustment is attached to a turntable plate or the lower plate of the rotatable clamping device, or both, the vernier adjustment permitting adjustment of the turntable plate or the lower plate of the rotatable clamping device, or both in at least one of the x, y and z directions.

9. The assembly of claim 1 wherein the rotatable clamping device further comprises at least one alignment bar.

10. The assembly of claim 9 wherein the at least one alignment bar is rotatably attached to the lower plate of the rotatable clamping device.

11. The assembly of claim 1 wherein the respective jaw of either the fixed clamping device and the rotatable clamping device is formed in the lower plate and the upper plate.

12. A method of attaching a component to a vessel having a boss with an adapter comprising:
   providing an assembly comprising:
      an adjustable frame including a support positioned between a first end and a second end, the frame adjustable in at least one of an x, y, and z direction;
      a fixed clamping device attached to the first end of the frame, the fixed clamping device comprising a lower plate and an upper plate pivotally attached to the lower plate, at least one of the lower and upper plates having a jaw formed therein, the jaw being shaped to hold a first adapter;
      a rotatable clamping device on the second end of the frame, the rotatable clamping device comprising a lower clamping plate, a lower plate rotatably attached to the lower clamping plate so that movement of the lower clamping plate causes rotation of the lower plate, and an upper plate pivotally attached to the lower plate, at least one of the lower and upper plates having a jaw formed therein, the jaw being shaped to hold a second adapter;
   placing the vessel on the support;
   rotating the vessel so that the first adapter fits into the jaw of one of the fixed clamping device or the rotatable clamping device;
   closing the upper plate of the one of the fixed clamping device or the rotatable clamping device to clamp the first adapter in place;
   rotating the vessel so that the second adapter fits into the jaw of the other of the fixed clamping device or the rotatable clamping device;

closing the upper plate of the other of the fixed clamping device or the rotatable clamping device to clamp the second adapter in place;

attaching at least one component to the first or second adapter.

13. The method of claim 12 further comprising attaching at least one component to the other of the first or second adapter.

14. The method of claim 13 further comprising adjusting a position of the at least one component attached to the second adapter based on a position of the at least one component attached to the first adapter.

15. The method of claim 12 further comprising adjusting the frame in the y direction before placing the vessel on the support.

16. The method of claim 12 further comprising adjusting the fixed clamping device in at least one of the x, y, and z directions before closing the upper plate of the fixed clamping device.

17. The method of claim 12 further comprising adjusting the rotatable clamping device in at least one of the x, y, and z directions before closing the upper plate of the rotatable clamping device.

18. The method of claim 12 wherein the fixed clamping device further comprises a vernier adjustment and further comprising adjusting a position of the lower plate of the fixed clamping device in at least one of the x, y, and z directions using the vernier adjustment before closing the upper plate of the fixed clamping device.

19. The method of claim 12 wherein the rotatable clamping device further comprises a vernier adjustment and further comprising adjusting a position of the lower plate of the rotatable clamping device in at least one of the x, y, and z directions using the vernier adjustment before closing the upper plate of the rotatable clamping device.

20. The method of claim 12 wherein the rotatable clamping device further comprises at least one alignment bar, and further comprising rotating the at least one alignment bar so that the at least one alignment bar is next to the at least one component before tightening the at least one component.

21. The method of claim 12 wherein the upper plate of the rotatable clamping device is closed before the upper plate of the fixed clamping device is closed.

* * * * *